United States Patent
Ochi et al.

(10) Patent No.: US 7,495,861 B2
(45) Date of Patent: Feb. 24, 2009

(54) CONTROL APPARATUS, CONTROL METHOD, AND COMPUTER PRODUCT FOR MAGNETIC TAPE DEVICE

(75) Inventors: Yoshiaki Ochi, Kawasaki (JP); Yasuhiko Hanaoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 114 days.

(21) Appl. No.: 11/641,717

(22) Filed: Dec. 20, 2006

(65) Prior Publication Data

US 2008/0030887 A1  Feb. 7, 2008

(30) Foreign Application Priority Data

Aug. 7, 2006  (JP) .............................. 2006-214839

(51) Int. Cl.
*G11B 5/584* (2006.01)
(52) U.S. Cl. .................................. 360/77.12
(58) Field of Classification Search .............. 360/77.12, 360/75, 48, 69, 70, 71, 72.1, 72.2; 340/572.1; 719/321
See application file for complete search history.

(56) References Cited

U.S. PATENT DOCUMENTS

| | | | | |
|---|---|---|---|---|
| 5,369,532 A | * | 11/1994 | Dodt et al. ..................... 360/48 |
| 6,031,682 A | * | 2/2000 | Nelson ..................... 360/77.12 |
| 6,766,520 B1 | * | 7/2004 | Rieschl et al. .............. 719/321 |
| 7,164,551 B2 | * | 1/2007 | Urano et al. ............. 360/77.12 |
| 7,304,576 B2 | * | 12/2007 | Findlay et al. ........... 340/572.1 |

FOREIGN PATENT DOCUMENTS

| | | |
|---|---|---|
| JP | 6-259930 | 9/1994 |
| JP | 07-114443 | 5/1995 |
| JP | 07-176169 | 7/1995 |
| KR | 1999-0040519 | 6/1999 |
| KR | 1999-0040520 | 6/1999 |

OTHER PUBLICATIONS

Office Action issued in corresponding Korean Patent Application No. 10-2007-0003778, mailed on Dec. 6, 2007.
Office Action mailed on Jul. 22, 2008 and issued in corresponding Korean Patent Application No. 10-2007-0003778.

* cited by examiner

*Primary Examiner*—Fred Tzeng
(74) *Attorney, Agent, or Firm*—Staas & Halsey LLP (57) ABSTRACT

A header data storage unit stores therein header data that identifies each file. A header data reader reads the stored header data, from the header data of the first file written to a magnetic tape to the header data of a target file, in order in which the files have been written to the magnetic tape. Based on the number of files whose header data have been read, an input/output controller controls positioning of a magnetic head.

12 Claims, 10 Drawing Sheets

| FILE NUMBER | CONTROL DATA 1 | CONTROL DATA 2 | CONTROL DATA 3 | CONTROL DATA 4 |
|---|---|---|---|---|
| 1 | HD 1 | HD 2 | EOF 1 | EOF 2 |
| 2 | HD 1 | HD 2 | EOF 1 | EOF 2 |
| 3 | HD 1 | HD 2 | EOF 1 | EOF 2 |
| ⋮ | ⋮ | ⋮ | ⋮ | ⋮ |
| X-1 | HD 1 | HD 2 | EOF 1 | EOF 2 |
| X | HD 1 | HD 2 | EOF 1 | EOF 2 |
| ⋮ | ⋮ | ⋮ | ⋮ | ⋮ |

FIG.4

MAGNETIC TAPE

HEADER DATA

| FILE NUMBER | CONTROL DATA 1 | CONTROL DATA 2 | CONTROL DATA 3 | CONTROL DATA 4 |
|---|---|---|---|---|
| 1 | HD 1 (1) | HD 2 (2) | EOF 1 (8) | EOF 2 (9) |
| 2 | HD 1 | HD 2 | EOF 1 | EOF 2 |
| 3 | HD 1 | HD 2 | EOF 1 | EOF 2 |
| ... | ... | ... | ... | ... |
| X−1 | HD 1 | HD 2 | EOF 1 | EOF 2 |
| X | HD 1 | HD 2 | EOF 1 | EOF 2 |
| ... | ... | ... | ... | ... |

(12)

MAGNETIC TAPE

CONTROL APPARATUS, CONTROL METHOD, AND COMPUTER PRODUCT FOR MAGNETIC TAPE DEVICE

BACKGROUND OF THE INVENTION

1. Field of the Invention

The present invention relates to a technology for positioning a head of a magnetic tape device.

2. Description of the Related Art

In a controller of a magnetic tape device (hereinafter, "magnetic tape controller") that reads data from and writes data to a magnetic tape, it has been common that, when positioned at a file specified by a host computer, such as a mainframe computer, in a multifile magnetic tape written with a plurality of files, a magnetic head sequentially reads a header label written at the head of each file from the beginning of the magnetic tape and is positioned sequentially at each file until the specified file is found.

Figure 9:
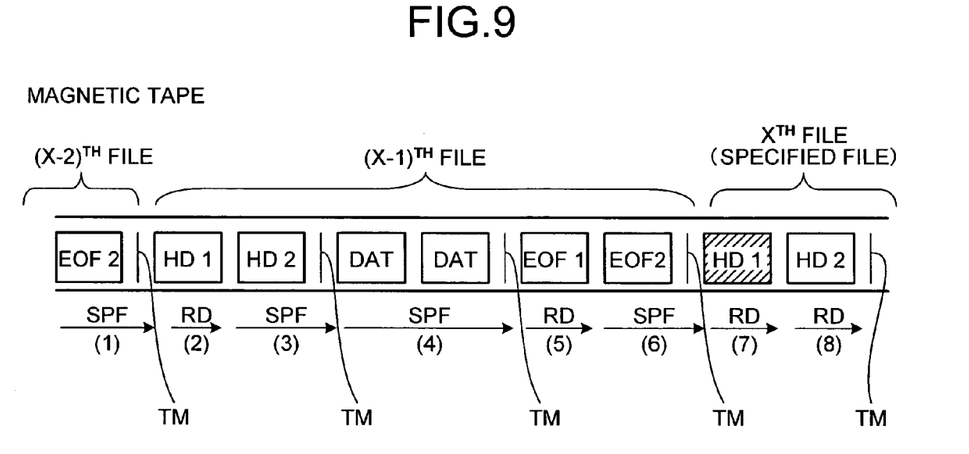
FIG. 9 is a schematic for explaining a conventional head positioning process.

FIG. 9 is a schematic for explaining the conventional process of positioning the head of the magnetic tape. FIG. 9 depicts part of files written to the magnetic tape. In FIG. 9, "HD1" and "HD2" are header labels written at the head of the files; "DAT" is user data; "EOF1" and "EOF2" are end labels written at the end of the files; and "TM" is separator data for separating the header labels, the user data, and the end labels. Further, "SPF" is a command for skipping the files recorded on the magnetic tape. i.e., moving the magnetic head from one TM to another TM; and "RD" is a command for reading labels and the user data recorded on the magnetic tape, i.e., reading a label and data at a position where the magnetic head is positioned.

Figure 10:
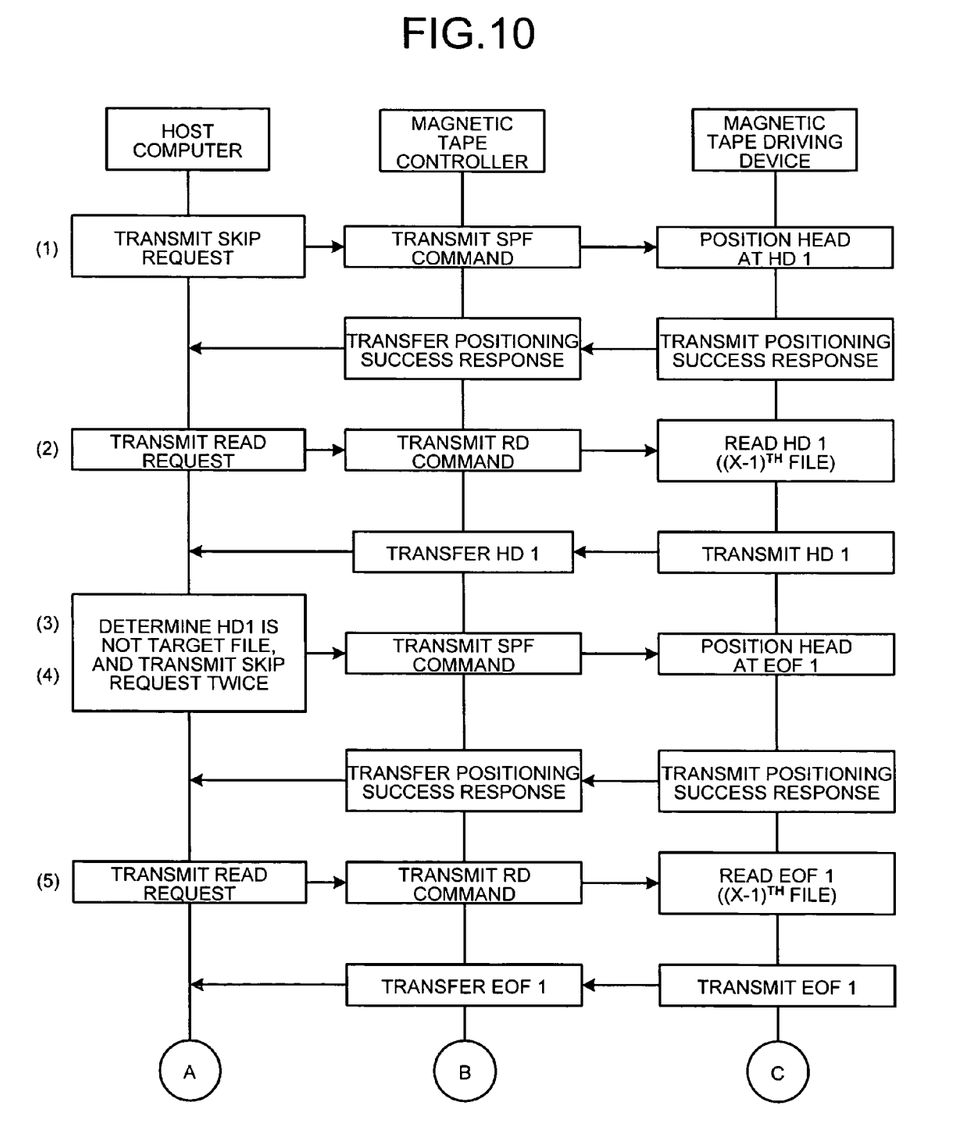
FIGS. 10 and 11 are sequence diagrams for explaining the conventional head positioning process.
Figure 11:
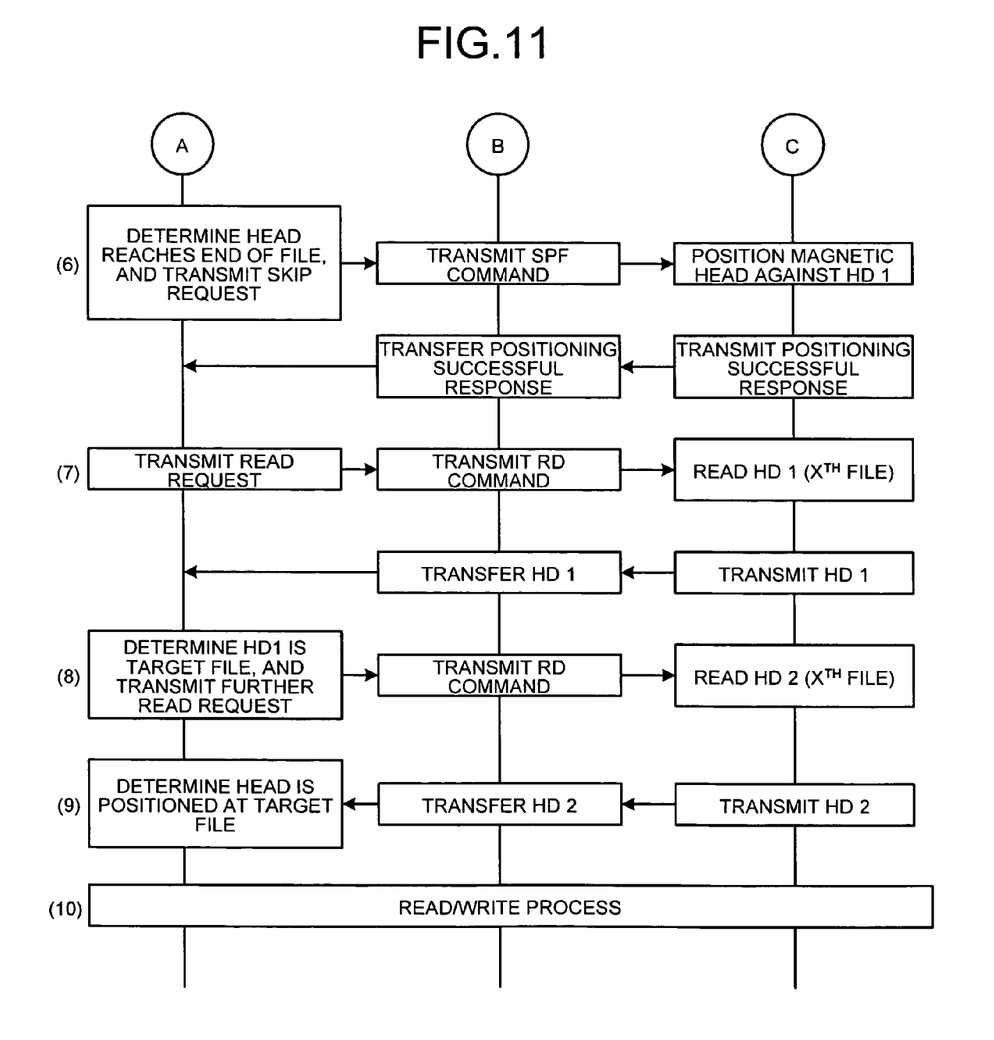

Positioning of the magnetic head at X-th file in the magnetic tape is explained. FIGS. 10 and 11 are sequence diagrams for explaining the conventional head positioning process. The host computer, the magnetic tape controller built into the magnetic tape device, and a magnetic tape driving device are shown in FIG. 10 and FIG. 11. Based on various requests transmitted by the host computer, the magnetic tape controller controls the magnetic tape driving device, thereby reading data from and writing data to the magnetic tape.

First, the host computer transmits a skip request to the magnetic tape controller (see (1) of FIG. 9 and FIG. 10), and the magnetic tape controller receives the skip request and transmits an SPF command to the magnetic tape driving device. Upon receiving the SPF command, the magnetic tape driving device causes the magnetic head to skip the data from a position at which the magnetic head is currently positioned to the next TM. Due to this, the magnetic head is positioned at the HD1 of (X−1)-th file. After positioning the magnetic head at the HD1, the magnetic tape driving device transmits a response indicating successful positioning (hereinafter, "positioning success response") to the magnetic tape controller, and the magnetic tape controller transfers the positioning success response to the host computer.

Upon receiving the positioning success response, the host computer transmits a read request (a read request of data) to the magnetic tape controller (see (2) of FIG. 9 and FIG. 10). Upon receiving the read request, the magnetic tape controller transmits an RD command to the magnetic tape driving device. Upon receiving the RD command, the magnetic tape driving device reads the HD1 of the (X−1)-th file from the magnetic tape and transmits the read HD1 to the magnetic tape controller. The magnetic tape controller transfers the received HD1 to the host computer.

Upon receiving the HD1, the host computer determines that the received HD1 is not the HD1 of the target file (X-th file) and transmits the skip request twice to the magnetic tape controller (see (3), (4) of FIG. 9 and FIG. 10). Upon receiving the skip request twice, the magnetic tape controller transfers the SPF command twice to the magnetic tape driving device. Upon receiving the SPF command twice, the magnetic tape driving device positions the magnetic head at the EOF1 of the (X−1)-th file and transmits a positioning success response to the magnetic tape controller. The magnetic tape controller transfers the received positioning success response to the host computer.

Upon receiving the positioning success response, the host computer transmits a read request to the magnetic tape controller (see (5) of FIG. 9 and FIG. 10). Upon receiving the read request, the magnetic tape controller transmits the RD command to the magnetic tape driving device. Upon receiving the RD command, the magnetic tape driving device reads the EOF1 of the (X−1)-th file from the magnetic tape and transmits the read EOF1 to the magnetic tape controller. The magnetic tape controller transfers the received EOF1 to the host computer.

Upon receiving the EOF1, the host computer determines that the magnetic head has reached the end of the file and transmits a skip request to the magnetic tape controller (see (6) of FIG. 9 and FIG. 11). Upon receiving the skip request, the magnetic tape controller transmits the SPF command to the magnetic tape driving device. Upon receiving the SPF command, the magnetic tape driving device positions the magnetic head at the HD1 of the X-th file and transmits a positioning success response to the magnetic tape controller. The magnetic tape controller transfers the received positioning success response to the host computer.

Upon receiving the positioning success response, the host computer transmits a read request to the magnetic tape controller (see (7) of FIG. 9 and FIG. 11). Upon receiving the read request, the magnetic tape controller transmits the RD command to the magnetic tape driving device. Upon receiving the RD command, the magnetic tape driving device reads the HD1 of the X-th file from the magnetic tape and transmits the read HD1 to the magnetic tape controller. The magnetic tape controller transfers the received HD1 to the host computer.

Upon receiving the HD1, the host computer determines that the received HD1 is the HD1 of the target file (X-th file) and transmits the read request for confirmation to the magnetic tape controller (see (8) of FIG. 9 and FIG. 11). Upon receiving the read request; the magnetic tape controller transmits the RD command to the magnetic tape driving device. Upon receiving the RD command, the magnetic tape driving device reads the HD2 of the X-th file from the magnetic tape and transmits the read HD2 to the magnetic tape controller. Upon receiving the HD2, the magnetic tape controller transfers the HD2 to the host computer. Upon receiving the HD2, the host computer determines that the magnetic head is positioned at the target file (X-th file) (see (9) of FIG. 11). Next, the magnetic tape controller and the magnetic tape driving device carry out a reading process and a writing process of data according to an instruction from the host computer (see (10) of FIG. 11).

Thus, in the conventional process of positioning the magnetic head of the magnetic tape, the magnetic head confirms the header label of each file while sequentially skipping the files from the head of the magnetic tape until the magnetic head is positioned at the target file. Due to this, the head positioning process requires significantly long time.

For example, in a method disclosed in Japanese Patent Application Laid-Open No. H6-259930, position data, which includes a correspondence between a start position of a file and a number of spindle rotations and a correspondence between an end position of the file and a number of spindle rotations, is recorded in a predetermined area at the head of the magnetic tape. During loading of the magnetic tape, the position data is loaded in a memory of the magnetic tape device. When positioning the magnetic head at the target file, the number of spindle rotations corresponding to the start position of the target file is fetched from the position data loaded in the memory. The spindle is rotated with a high speed until a number of spindle rotations correspond to the fetched number of spindle rotations. Thus, the method enables to position the magnetic head at the target file within a short time.

However, in the conventional method, because the number of spindle rotations is used to position the magnetic head at the target file, during occurrence of an error in the spindle rotations due to external shocks or component fatigue, accurately positioning the magnetic head at a start position of the target file becomes difficult.

Although recently recording media such as a magnetic disk or a magneto optical disk are widely used, the magnetic tape plays an important role as a recording medium for backup of such recording media.

Thus, there is a need of a technology for reliably and swiftly positioning the magnetic head at a target file.

SUMMARY OF THE INVENTION

It is an object of the present invention to at least partially solve the problems in the conventional technology.

According to an aspect of the present invention, a magnetic-tape-device control apparatus that controls positioning of a head of a magnetic tape device to position the head at a target file among a plurality of files written to a magnetic tape, includes a storage unit that stores therein header data that identifies each of the files, a reading unit that reads the header data stored in the storage unit, from header data of a first file written to the magnetic tape to the header data of the target file, in order in which the files have been written to the magnetic tape, and a positioning unit that controls positioning of the head based on number of files whose header data have been read by the reading unit.

According to another aspect of the present invention, a magnetic-tape-device control method for controlling positioning of a head of a magnetic tape device to position the head at a target file among a plurality of files written to a magnetic tape, includes storing header data that identifies each of the files, reading stored header data, from header data of a first file written to the magnetic tape to the header data of the target file, in order in which the files have been written to the magnetic tape, and controlling positioning of the head based on number of files whose header data have been read by the reading unit.

According to still another aspect of the present invention, a computer-readable recording medium stores therein a computer program that causes a computer to implement the above methods.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below with reference to the accompanying drawings.

According to an embodiment of the present invention, a magnetic tape controller is built into the magnetic tape device and controls positioning of the magnetic head at a target file among a plurality of files written to a magnetic tape. The magnetic tape controller stores in a storage unit, such as a memory, header data that identifies each file. The magnetic tape controller reads the header data stored in the storage unit, from the header data of a first file written to the magnetic tape to the header data of the target file, in order in which the files have been written to the magnetic tape. Based on the number of files whose header data have been read, the magnetic tape controller controls positioning of the magnetic head.

Thus, by using the header data that identifies each file to determine the target file, the magnetic tape controller included in the magnetic tape device according to the embodiment can reliably position the magnetic head at the target file. Further, by using the stored header data, the magnetic tape controller can virtually confirm, without accessing the magnetic tape, the header data of each file that is necessary in a process to position the magnetic head. Thus, the magnetic head can be reliably positioned at the target file within a short time.

Figure 1:
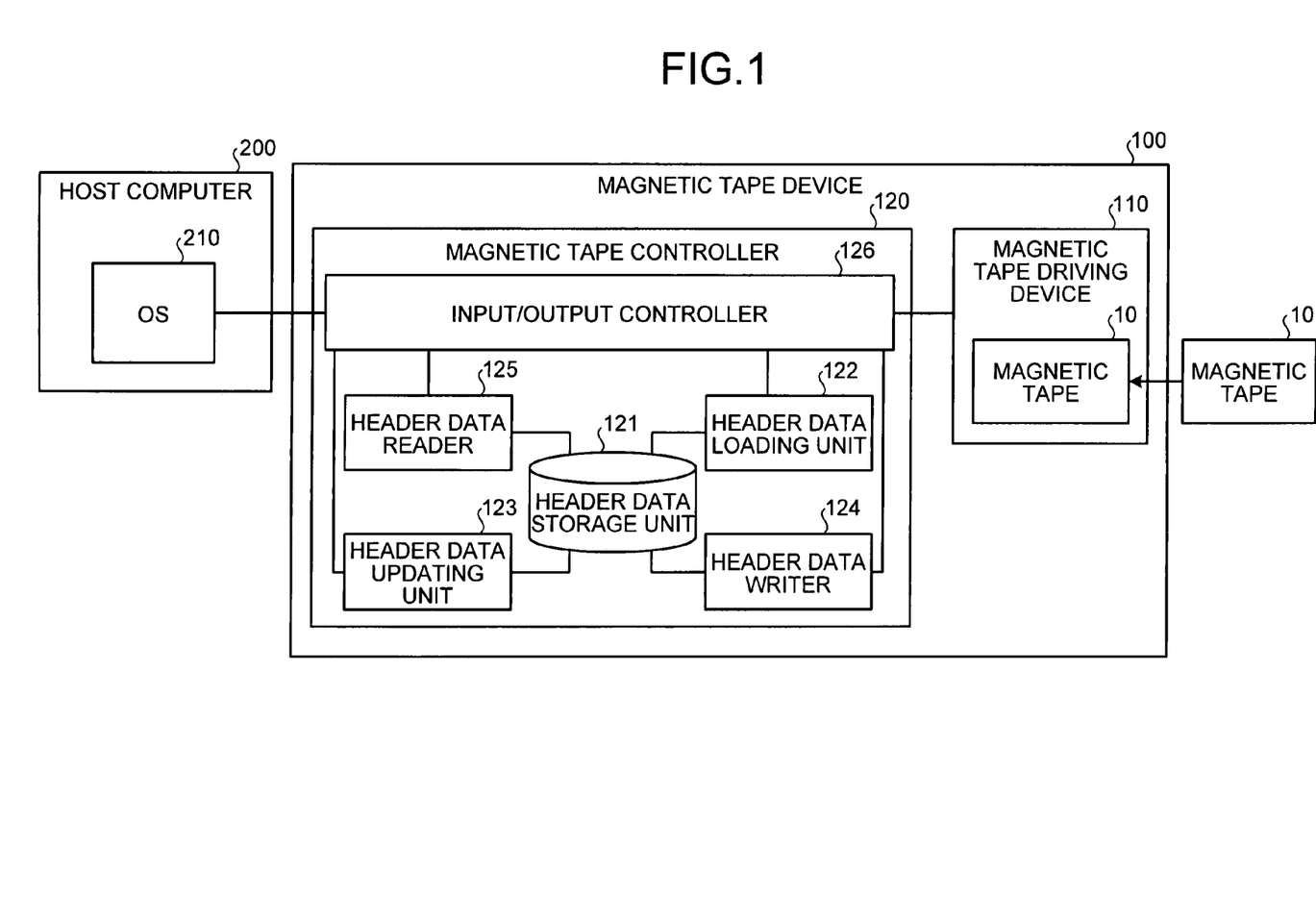
FIG. 1 is a functional block diagram of a magnetic tape device according to an embodiment of the present invention.

FIG. 1 is a functional block diagram of a magnetic tape device 100 according to the embodiment. The magnetic tape device 100 is connected to a host computer 200. Based on a read request or a write request transmitted from an operating system (OS) 210 of the host computer 200, the magnetic tape device 100 reads recorded data from or writes data to a magnetic tape 10. The magnetic tape device 100 includes a magnetic tape driving device 110 and a magnetic tape controller 120.

The magnetic tape driving device 110 includes functioning units such as a not shown magnetic head and a take up reel. By using the functioning units, the magnetic tape driving device 110 reads the recorded data from or writes data to the magnetic tape 10 based on various commands and data transmitted from the magnetic tape controller 120. The magnetic tape driving device 110 transmits various process results, read data etc. to the magnetic tape controller 120. Upon loading of the magnetic tape 10 on the magnetic tape driving device 110, the magnetic tape driving device 110 transmits a tape loading notification to the magnetic tape controller 120.

Figure 2:
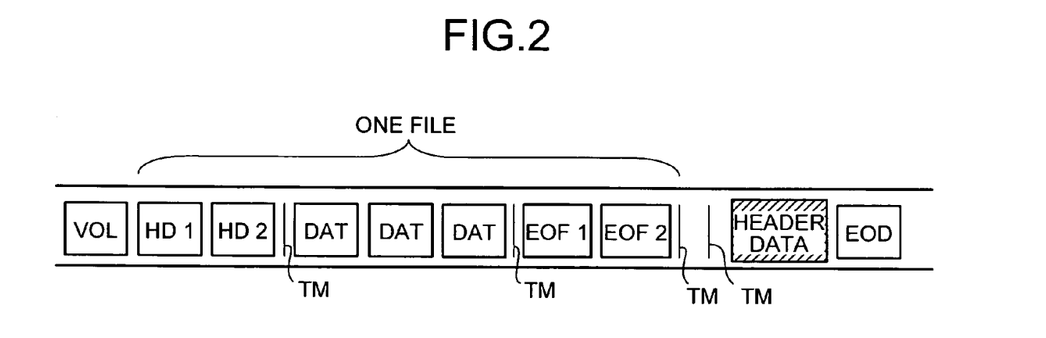
FIG. 2 is a schematic of a data recording format of a magnetic tape shown in FIG. 1.

FIG. 2 is a schematic of the data recording format of the magnetic tape 10. As shown in FIG. 2, first a volume header label (VOL) is recorded at the head of the magnetic tape 10 and the files are sequentially recorded next.

Each file includes a header label, user data (DAT), and an end label. The header label sequentially includes a header label 1 (HD1) and a header label 2 (HD2) and the end label sequentially includes an end label 1 (EOF1) and an end label 2 (EOF2). A file name to identify the file is set in the HD1 and data format of the file is set in the HD2. Thus, reading and confirming the HD1 label enables to confirm whether the file is the target file.

Separator data called Tape Mark (TM) are recorded between the HD2 and the DAT, the DAT and the EOF1, and the EOF2 and the HD1. To be specific, two TM are serially recorded after the end label 2 of the last file.

Figure 3:
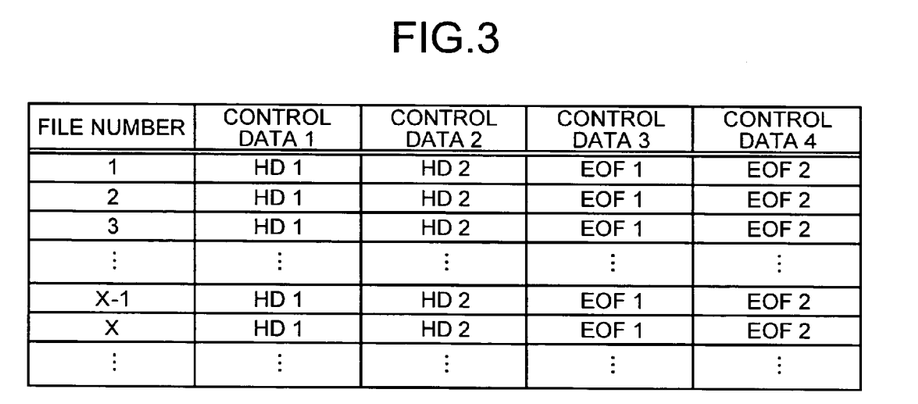
FIG. 3 is an example of header data according to the embodiment.
Figure 4:
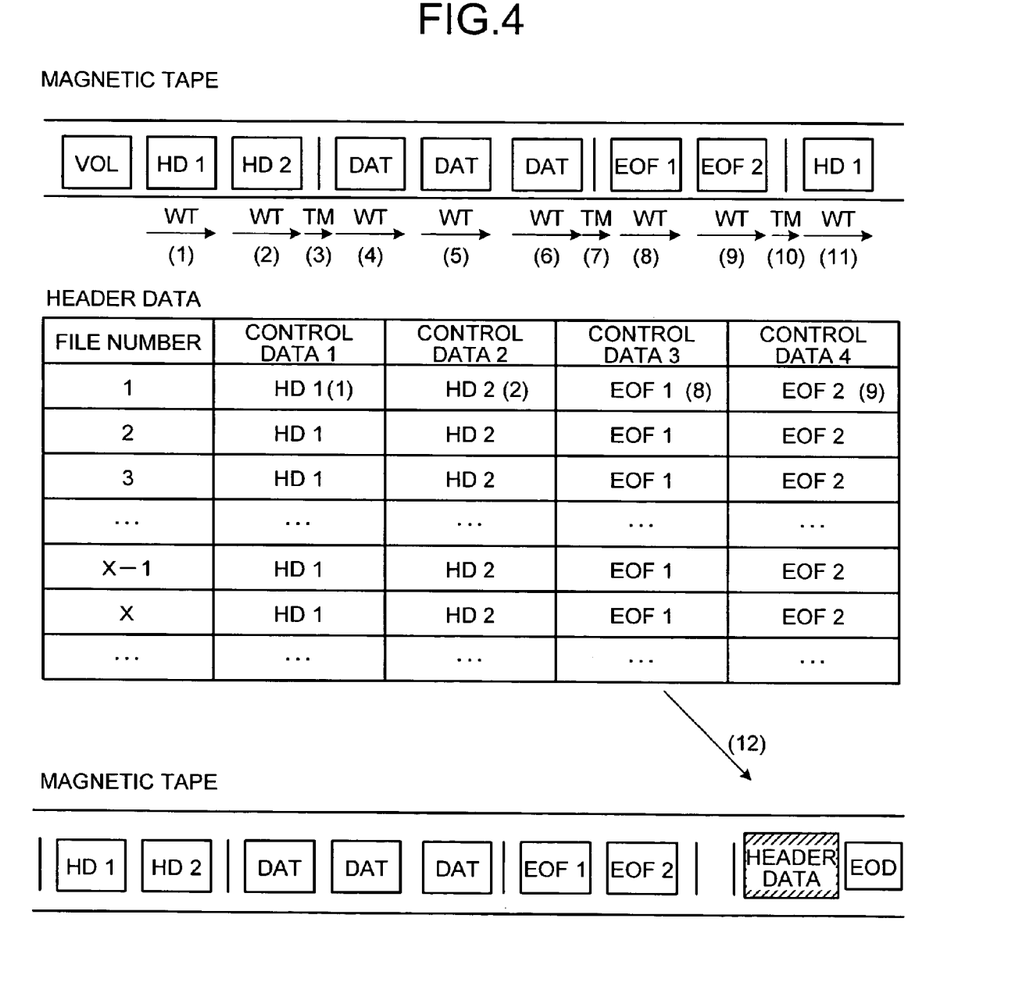
FIG. 4 is a schematic for explaining a file writing process performed by the magnetic tape device.

The header data and a data end label (EOD) are recorded sequentially after the two serial TM. The recorded header data includes the HD1, the HD2, the EOF1, and the EOF2 of all the files recorded on the magnetic tape 10. FIG. 3 is an example of the header data according to the embodiment. To be specific, as shown in FIG. 4, the header data includes data corresponding to each file, such as a file number that indicates a storage sequence of the file, control data 1 that indicates the HD1, control data 2 that indicates the HD2, control data 3 that indicates the EOF1, and control data 4 that indicates the EOF2.

Returning to FIG. 1, based on the read request or the write request transmitted from the OS 210 of the host computer 200, the magnetic tape controller 120 transmits the commands and the data to the magnetic tape driving device 110 and transmits to the host computer 200, process results and data that are transmitted accordingly by the magnetic tape driving device 110. The magnetic tape controller 120 includes a header data storage unit 121, a header data loading unit 122, a header data updating unit 123, a header data writer 124, a header data reader 125, and an input/output controller 126 that are closely related to the present invention.

When the magnetic tape 10 is loaded on the magnetic tape driving device 110, the header data storage unit 121 stores therein the header data read from the magnetic tape 10. The header data storage unit 121 stores the header data while the magnetic tape 10 is being loaded on the magnetic tape driving device 110.

The header data loading unit 122 fetches the header data recorded on the magnetic tape 10. Upon loading of the magnetic tape 10 on the magnetic tape driving device 110, based on an instruction from the input/output controller 126, the header data loading unit 122 reads the header data from the magnetic tape driving device 110 and stores the read header data in the header data storage unit 121.

Based on the instruction from the input/output controller 126, the header data updating unit 123 updates the header data stored in the header data storage unit 121. When data is written to the magnetic tape 10, the header data updating unit 123 adds and records in the already stored header data, the header data of the file that is subjected to writing of the data. Upon completion of a reading process or a writing process of the file, the header data updating unit 123 deletes all the header data stored at the time.

The header data writer 124 writes to the magnetic tape 10, the header data that is stored in the header data storage unit 121. Upon completion of writing of data to the magnetic tape 10, based on an instruction from the input/output controller 126, the header data writer 124 instructs the magnetic tape driving device 110 to write after the last file, the header data stored in the header data storage unit 121 at the time.

Based on the instruction from the input/output controller 126, the header data reader 125 accesses the header data stored in the header data storage unit 121. Upon receiving a skip instruction from the input/output controller 126, the header data reader 125 skips, sequentially according to file numbers and also sequentially according to the control data 1, 2, 3, and 4, entries included in the header data that is stored in the header data storage unit 121 such that entries of one file are skipped for a single skip instruction. However, the header data reader 125 carries out skipping from the control data 2 to the control data 3 only after receiving two subsequent skip instructions.

Because the header data reader 125 uses the magnetic tape 10 to virtually skip the files, when skipping from the control data 2 to the control data 3, the header data reader 125 assumes that the DAT included between the HD2 and the EOF1 on the actual magnetic tape 10 is also skipped, thus necessitating two subsequent skip instructions.

Based on various requests transmitted from the OS 210 of the host computer 200, the input/output controller 126 transmits various commands and data to the magnetic tape driving device 110 and transmits to the host computer 200, the process results and the data that are transmitted accordingly by the magnetic tape driving device 110.

To be specific, upon receiving a magnetic tape loading notification from the magnetic tape driving device 110, the input/output controller 126 instructs the header data loading unit 122 to read the header data and store the read header data in the header data storage unit 121.

Upon receiving a skip request from the OS 210 of the host computer 200, the input/output controller 126 instructs the header data reader 125 to skip the control data.

Upon receiving the read request from the OS 210 of the host computer 200, the input/output controller 126 instructs the header data reader 125 to read the control data at a position where the magnetic head is currently positioned. HD2 as the read control data indicates that a file of the HD2 is the target file. If the read control data is HD2, the input/output controller 126 transmits to the magnetic tape driving device 110, a SPACE command that can skip multiple TM, thus positioning the magnetic head at the TM that is after the HD2.

Along with the SPACE command, the input/output controller 126 transmits to the magnetic tape driving device 110, a skip count that indicates a number of TM from the head of the magnetic tape 10 for positioning the magnetic head. A skip count N is calculated by $N=(X-1)\times 3-1$. To position the magnetic head at the TM that is after the HD2 of the X-th file from the head of the magnetic tape 10, the magnetic head needs to be positioned at the TM of $[(X-1)\times 3+]$-th file.

Upon receiving the write request from the OS 210 of the host computer 200, the input/output controller 126 transmits to the magnetic tape driving device 110 a write command (WT command) and data for writing. Simultaneously, the input/output controller 126 delivers to the header data updating unit 123, the header data of the file that is included in the data for writing, thereby adding the header data to the header data that is stored in the header data storage unit 121. Upon completion of the write request from the OS 210, the input/output controller 126 instructs the header data writer 124 to write the header data and further instructs the magnetic tape driving device 110 to write the EOD.

A file writing process by the input/output controller 126 is explained in detail. FIG. 4 is a schematic for explaining the file writing process performed by the magnetic tape device 100. FIG. 4 depicts a head portion of the magnetic tape 10 written with a plurality of files. Writing of files from the head of the magnetic tape 10 is explained.

Upon the host computer 200 transmitting a write request of the first file, the input/output controller 126 transmits to the magnetic tape driving device 110, the WT command to write the HD1 of the file. Simultaneously, the input/output controller 126 instructs the header data updating unit 123 to write data of the HD1 in the control data 1 of the file number 1 of the header data (blank at the time) that is included in the header data storage unit 121 (see (1) of FIG. 4).

Next, the input/output controller 126 transmits to the magnetic tape driving device 110, the WT command to write the HD2 of the file. Simultaneously, the input/output controller 126 instructs the header data updating unit 123 to write data of the HD2 in the control data 2 of the file number 1 of the header data that is stored in the header data storage unit 121 (see (2) of FIG. 4).

After instructing the magnetic tape driving device 110 to write the TM (see (3) of FIG. 4), the input/output controller 126 transmits the WT command to write the user data of the file (see (4) to (6) of FIG. 4), and further instructs the magnetic tape driving device 110 to write the TM (see (7) of FIG. 4).

Next, the input/output controller 126 transmits to the magnetic tape driving device 110, the WT command to write the EOF1 of the file. Simultaneously, the input/output controller 126 instructs the header data updating unit 123 to write data of the EOF1 in the control data 3 of the file number 1 of the header data that is stored in the header data storage unit 121 (see (8) of FIG. 4).

Next, the input/output controller 126 transmits to the magnetic tape driving device 110, the WT command to write the EOF2 of the file. Simultaneously, the input/output controller 126 instructs the header data updating unit 123 to write data of the EOF2 in the control data 4 of the file number 1 of the header data that is stored in the header data storage unit 121 (see (9) of FIG. 4).

Next, the input/output controller 126 instructs the magnetic tape driving device 110 to write the TM (see (10) of FIG. 4).

Upon the host computer 200 transmitting a write request of the second file, the input/output controller 126 transmits to the magnetic tape driving device 110, the WT command to write the HD1 of the second file. Simultaneously, the input/output controller 126 instructs the header data updating unit 123 to write data of the HD1 in the control data 1 of the file number 2 of the header data (blank at the time) that is stored in the header data storage unit 121 (see (11) of FIG. 4).

As shown in FIG. 4, the input/output controller 126 repeats the process from (2) to (10) and records in the header data storage unit 121, data of the file numbers 1,2,3, . . . , X−1, X that are included in the header data.

Upon completion of a string of the write requests from the host computer 200, the input/output controller 126 instructs the magnetic tape driving device 110 to serially write two TM and instructs the header data writer 124 to write after the last file of the magnetic tape 10, the header data that is stored in the header data storage unit 121 (see (12) of FIG. 4). Finally, the input/output controller 126 instructs the magnetic tape driving device 110 to write the EOD.

Figure 5:
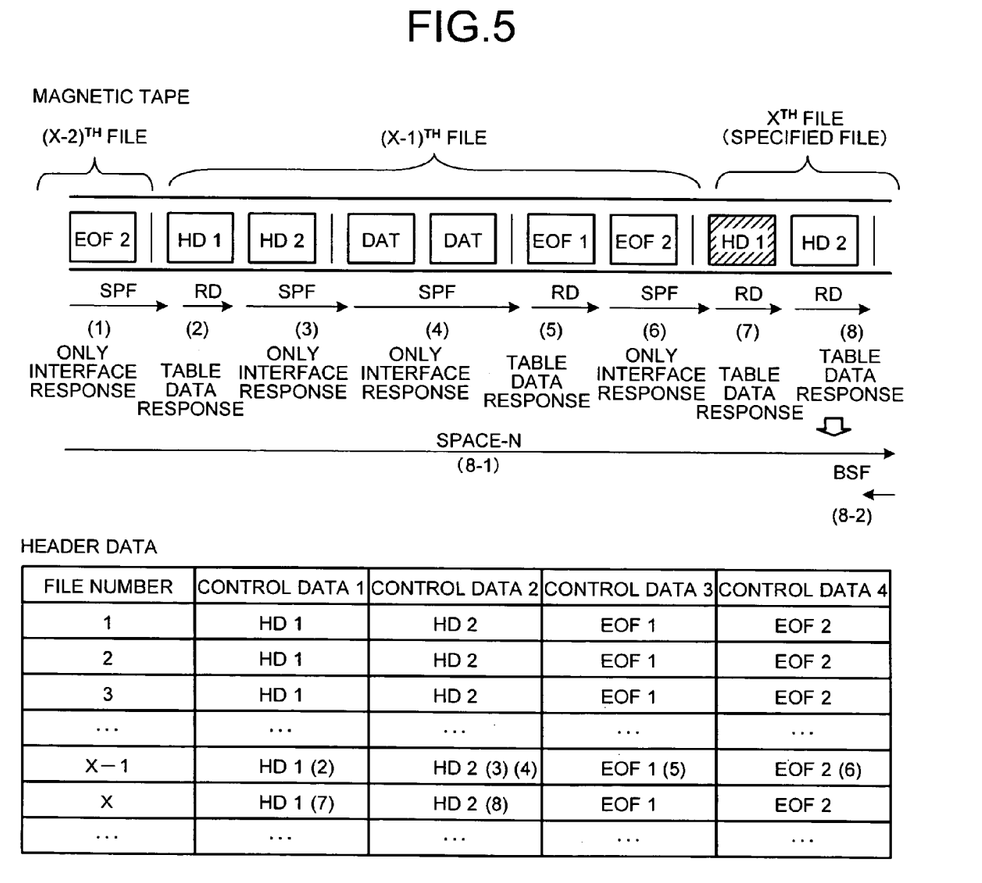
FIG. 5 is a schematic for explaining a head positioning process performed by the magnetic tape device.

FIG. 5 is a schematic of a head positioning process by the magnetic tape device 100. Some of the files written to the magnetic tape 10 are shown in FIG. 5. A process to position the magnetic head at the X-th file in the magnetic tape 10 is explained.

Figure 6:
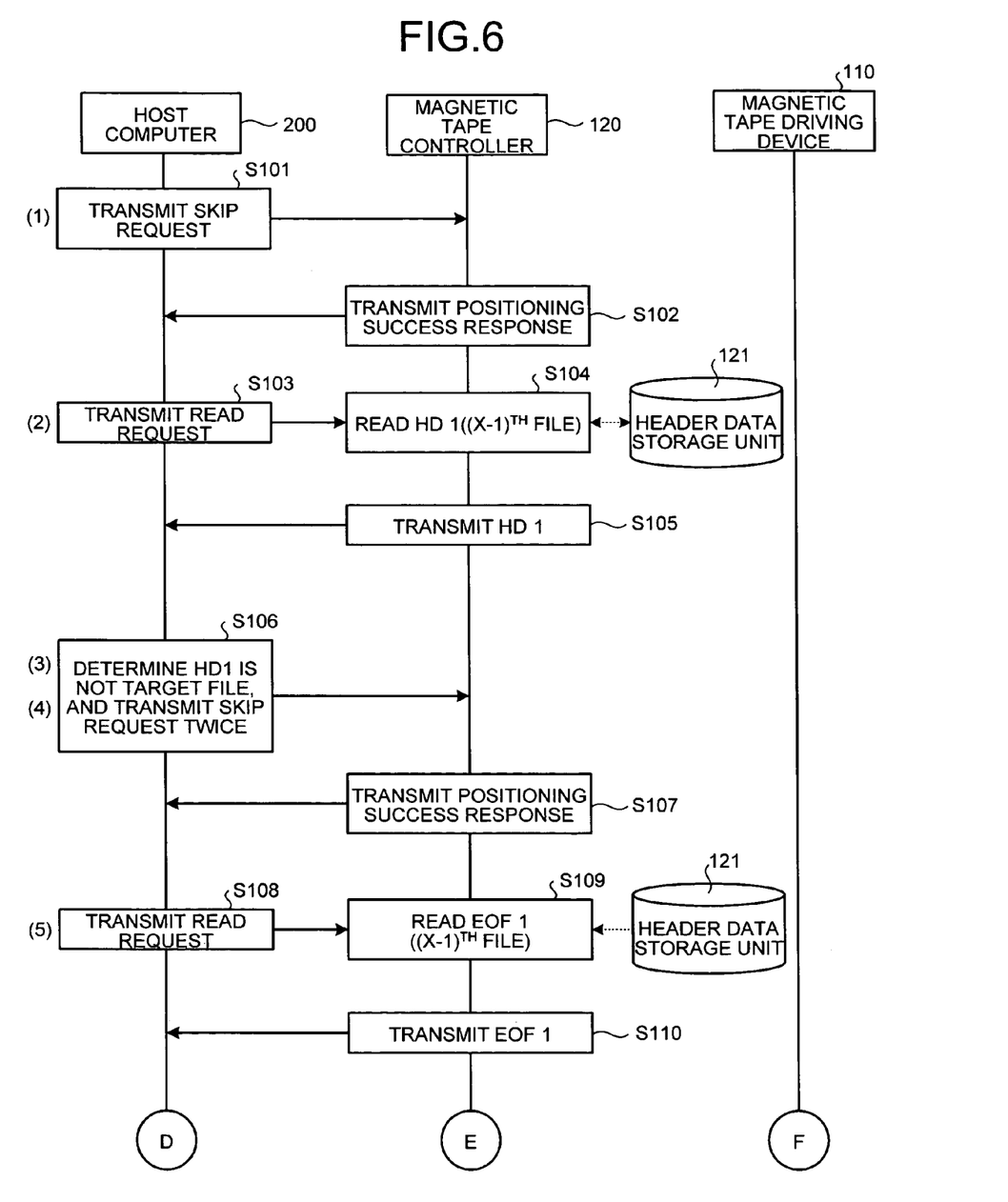
FIGS. 6 and 7 are sequence diagrams of the head positioning process.
Figure 7:
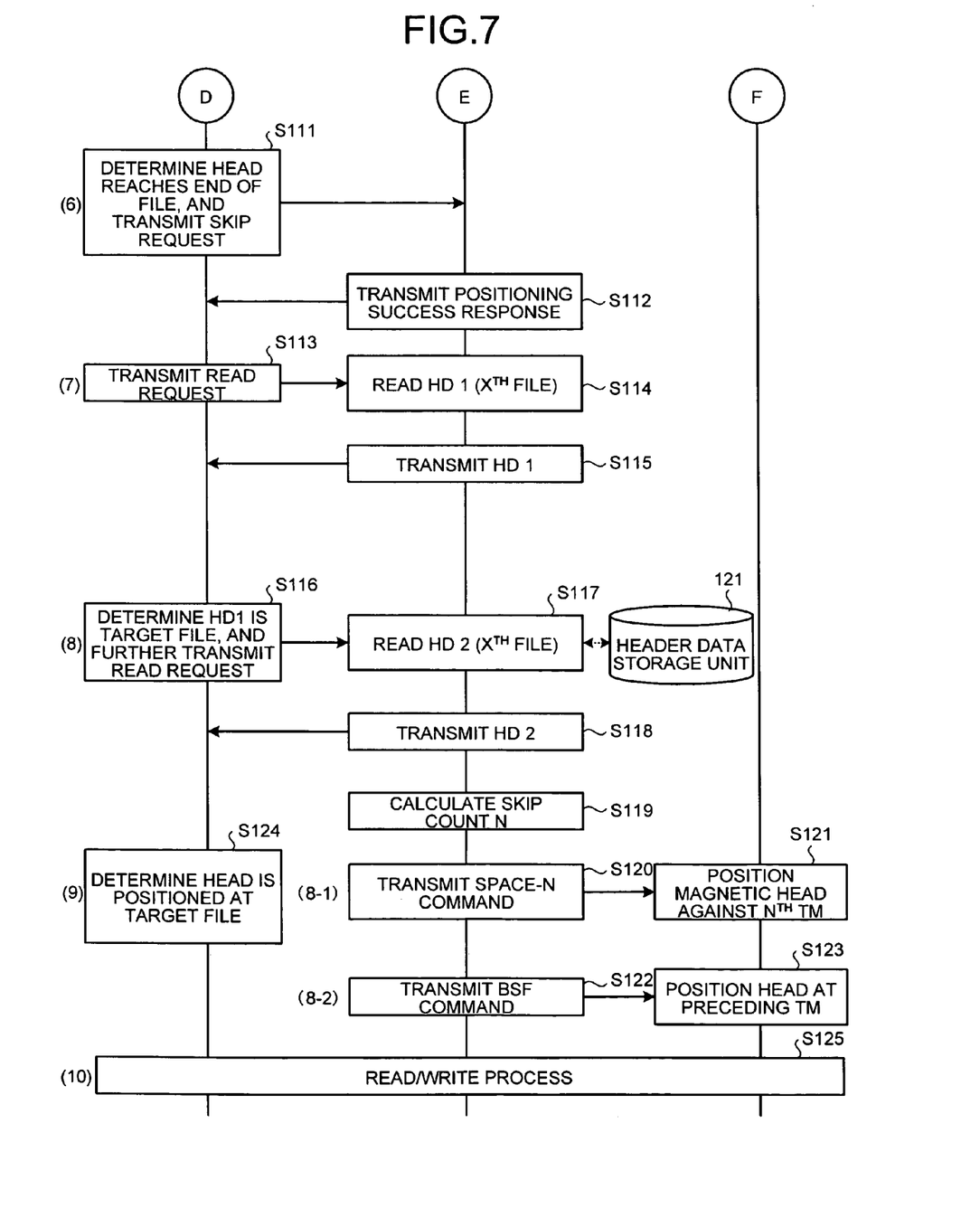

FIGS. 6 and 7 are sequence diagrams of the head positioning process performed by the magnetic tape device 100. The magnetic tape 10 is already loaded on the magnetic tape driving device 110 and the header data is stored in the header data storage unit 121.

The host computer 200 transmits a skip request (see (1) of FIG. 5 and FIG. 6) (step S101), and the magnetic tape controller 120 receives the skip request and transmits a positioning success response to the host computer 200 (step S102).

Upon receiving the positioning success response, the host computer 200 transmits a read request to the magnetic tape controller 120 (see (2) of FIG. 5 and FIG. 6) (step S103). Upon receiving the read request, the magnetic tape controller 120 refers to the header data storage unit 121 and reads the control data at a position where the magnetic head is currently positioned (step S104). In the example shown in FIG. 5, the magnetic tape controller 120 reads the HD1 of the (X−1)-th file. The magnetic tape controller 120 transmits the read HD1 to the host computer 200 (step S105).

Upon receiving the HD1, the host computer 200 determines that the received HD1 is not the HD1 of the target file (X-th file) and transmits the skip request twice to the magnetic tape controller 120 (see (3), (4) of FIG. 5 and FIG. 6) (step S106). Upon receiving the skip request, the magnetic tape controller 120 refers to the header data storage unit 121, skips reading the HD2 of the (X−1)-th file, and positions the magnetic head at the EOF1. The magnetic tape controller 120 transmits a positioning success response to the host computer 200 (step S107).

Upon receiving the positioning success response, the host computer 200 transmits a read request to the magnetic tape controller 120 (see (5) of FIG. 5 and FIG. 6) (step S108). Upon receiving the read request, the magnetic tape controller 120 refers to the header data storage unit 121 and reads the EOF1 of the (X−1)-th file at a position where the magnetic head is currently positioned (step S109). The magnetic tape controller 120 transfers the read EOF1 to the host computer 200 (step S110).

Upon receiving the EOF1, the host computer 200 determines that the magnetic head has reached the end of the file and transmits a skip request to the magnetic tape controller 120 (see (6) of FIG. 5 and FIG. 7) (step S111). Upon receiving the skip request, the magnetic tape controller 120 refers to the header data storage unit 121, skips reading the EOF2 of the (X−1)-th file, and positions the magnetic head at the HD1 of the X-th file. The magnetic tape controller 120 transmits a positioning success response to the host computer 200 (step S112).

Upon receiving the positioning success response the host computer 200 transmits a read request to the magnetic tape controller 120 (see (7) of FIG. 5 and FIG. 7) (step S113). Upon receiving the read request, the magnetic tape controller 120 refers to the header data storage unit 121 and reads the HD1 of the X-th file at a position where the magnetic head is currently positioned (step S114). The magnetic tape controller 120 transmits the read HD1 to the host computer 200 (step S115).

Upon receiving the HD1, the host computer 200 determines that the received HD1 is the HD1 of the target file (X-th file) and transmits a read request for confirmation to the magnetic tape controller 120 (see (8) of FIG. 5 and FIG. 7) (step S116). Upon receiving the read request, the magnetic tape controller 120 refers to the header data storage unit 121 and reads the HD2 of the X-th file at a position where the magnetic head is currently positioned (step S117). The magnetic tape controller 120 transmits the read HD2 to the host computer 200 (step S118).

Next, the magnetic tape controller 120 calculates the skip count N (step S119) and transmits a SPACE-N command to the magnetic tape driving device 110 (see (8-1) of FIG. 5 and FIG. 7) (step S120). Upon receiving the SPACE-N command, the magnetic tape driving device 110 positions the magnetic head at the $N^{th}$ number of TM from the head of the magnetic tape 10 (step S121).

The magnetic tape controller 120 transmits a BSF command to the magnetic tape driving device 110 (see (8-2) of FIG. 5 and FIG. 7) (step S122). Upon receiving the BSF command, the magnetic tape driving device 110 positions the magnetic head at the TM that precedes the $N^{th}$ number of TM during the SPACE-N command (step S123).

Upon receiving the HD2, the host computer 200 determines that the magnetic head is positioned at the target file (X-th file) (see (9) of FIG. 7) (step S124). The magnetic tape controller 120 and the magnetic tape driving device 110 carry out the reading process and the writing process of data according to instructions from the host computer 200 (see (10) of FIG. 7) (step S125).

Although the magnetic tape 10 is shown in FIG. 5 for the sake of convenience, reading of data and positioning of the magnetic head at the magnetic tape 10 are not actually carried out in (1) to (8) of FIG. 6 and FIG. 7. In other words, the magnetic head of the magnetic tape driving device 110 does not operate in (1) to (8) of FIG. 6 and FIG. 7. Reading of data and positioning of the magnetic head are carried out only virtually by using the header data that is stored in the header data storage unit 121.

Thus, in the magnetic tape device 100 according to the embodiment, exchange of data between the magnetic tape device 100 the magnetic tape driving device 110 that is shown in (1) to (8) of FIG. 10 and FIG. 11 becomes unnecessary and the time required for file positioning can be reduced significantly compared to the conventional head positioning process shown in FIG. 10 and FIG. 11.

As described above, according to the embodiment, the header data storage unit 121 stores therein the header data that identifies each file. The header data reader 125 reads the header data stored in the header data storage unit 121, from the header data of the first file written to the magnetic tape 10 to the header data of the target file, in order in which the files have been written to the magnetic tape 10. Based on the number of files whose header data have been read, the input/output controller 126 controls positioning of the magnetic head. By using the header data that identifies the file to determine the file, the magnetic head can be reliably positioned at the target file. Further, without accessing the magnetic tape 10, it is possible to virtually check the header data of respective files necessary in the process of positioning the magnetic head with those stored in the header data storage unit 121. Thus, the magnetic head can be reliably and swiftly positioned at the target file.

When the magnetic tape 10 is mounted on the magnetic tape device 100, the header data loading unit 122 loads the header data from the magnetic tape 10 into the header data storage unit 121. When a file is written to the magnetic tape 10, the header data updating unit 123 stores in the header data storage unit 121 header data that identifies the file. Upon completion of writing of the file to the magnetic tape 10, the header data writer 124 writes the stored header data in a predetermined area of the magnetic tape 10. Thus, the header data can be automatically updated. Therefore, even if files are frequently written to the magnetic tape 10, there is no need to manually update the header data each time a file is written, which enhances convenience of the magnetic tape 10.

Moreover, the header data is written after the last file written to the magnetic tape 10. Therefore, even when the header data is written to an area whose range is fixed as the head of the magnetic tape 10, drawbacks such as inadequate storage capacity due to a narrow range of the area or unused area due to a wide range of the area can be avoided. Thus, the storage area of the magnetic tape 10 can be used efficiently.

Furthermore, the number of tape marks to be skipped during positioning of the magnetic head is calculated based on the number of files whose header data have been read, and the magnetic head is controlled to be positioned at the target file based on the calculated number of tape marks. Thus, with a skip command using the number of tape marks as a parameter, a plurality of files can be skipped by a single operation of the magnetic head. Thus, the magnetic head can be reliably and swiftly positioned at the target file.

An example of the magnetic tape controller 120 built into the magnetic tape device 100 is explained in the embodiment. However, the magnetic tape controller 120 need not be always built into the magnetic tape device 100 and can be included independently.

The controller of the magnetic tape device (the magnetic tape controller 120) is explained above as hardware; however, it can be implemented as software. In other words, a computer program (hereinafter, "magnetic-tape-device control program") can be executed on a computer to realize the same function as the controller of the magnetic tape device. In the following, such a computer is explained.

Figure 8:
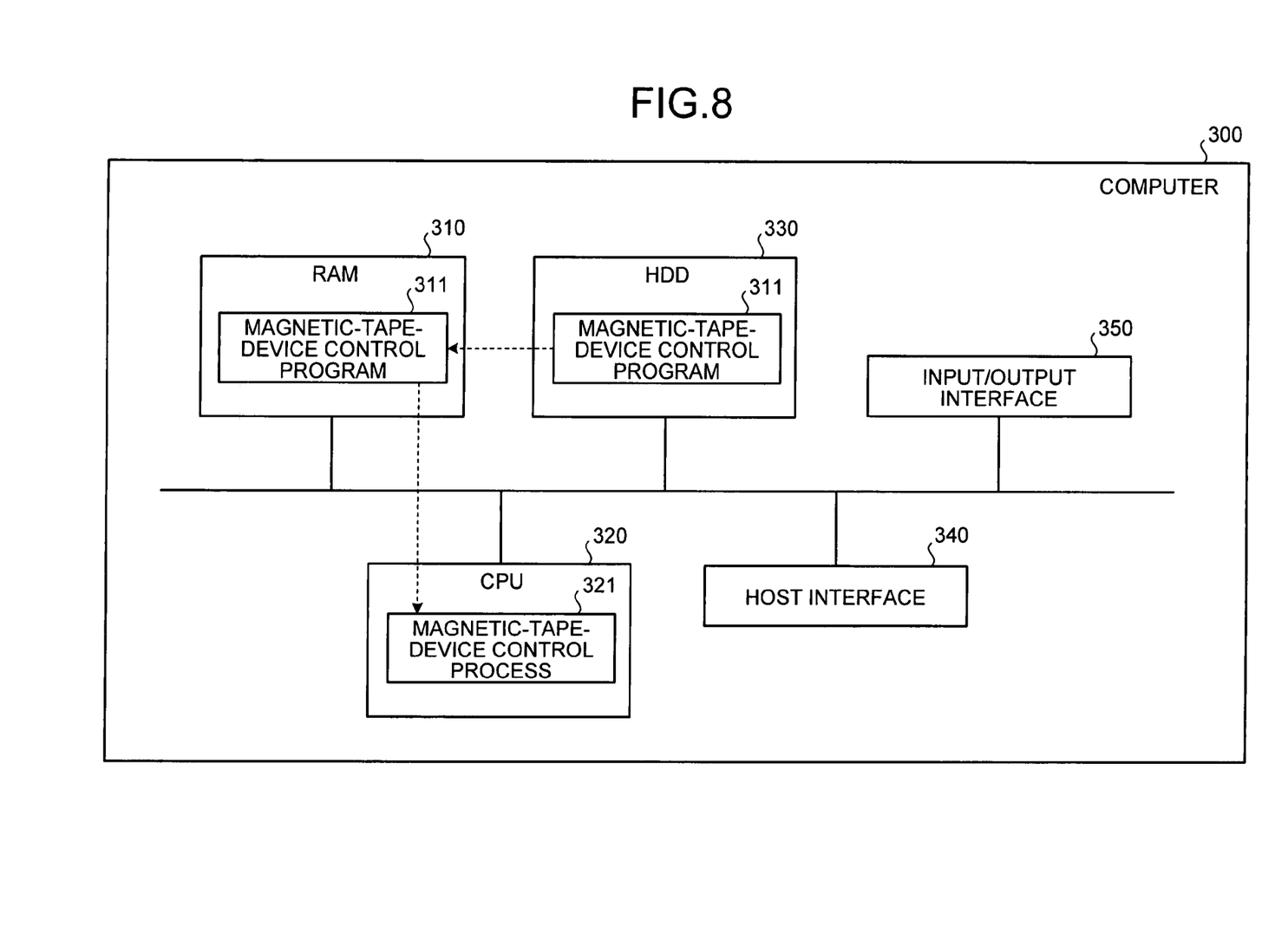
FIG. 8 is a functional block diagram of a computer that executes a magnetic-tape-device control program according to the embodiment.

FIG. 8 is a block diagram of a computer 300 that executes a magnetic-tape-device control program 311 according to the embodiment. The computer 300 includes a Random Access Memory (RAM) 310, a Central Processing Unit (CPU) 320, a Hard Disk Drive (HDD) 330, a host interface 340, and an input/output interface 350.

The RAM 310 stores therein programs or intermediate results during execution of the program. The CPU 320 reads the programs from the RAM 310.

The HDD 330 stores therein programs and data. The host interface 340 connects the computer 300 with the host computer 200.

The input/output interface 350 connects an input device such as an operation panel or a button etc., a display device, and the magnetic tape driving device 110 to the computer 300.

A magnetic-tape-device control program 311 executed on the computer 300 is stored in a database of the host computer 200 that is connected to the computer 300 via the host interface 340. The magnetic-tape-device control program 311 is downloaded from the database to the computer 300.

The installed magnetic-tape-device control program 311 is stored in the HDD 330 and loaded into the RAM 310 to be executed by the CPU 320 as a magnetic-tape-device control process 321.

All the automatic processes explained in the embodiment can be, entirely or in part, carried out manually. Similarly, all the manual processes explained in the embodiment can be entirely or in part carried out automatically by a known method.

The sequence of processes, the sequence of controls, specific names, and data including various parameters can be changed as required unless otherwise specified.

The constituent elements of the device illustrated are merely conceptual and may not necessarily physically resemble the structures shown in the drawings. The constituent elements of the device, as a whole or in parts, can be separated or integrated either functionally or physically in accordance with the load or how the device is to be used.

The process functions performed by the device are entirely or partially realized by the CPU or a program executed by the CPU or by wired logic hardware.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A magnetic-tape-device control apparatus that controls positioning of a head of a magnetic tape device to position the head at a target file among a plurality of files written to a magnetic tape, the magnetic-tape-device control apparatus comprising:

a storage unit that stores therein header data that identifies each of the files;

a reading unit that reads the header data stored in the storage unit, from header data of a first file written to the magnetic tape to the header data of the target file, in order in which the files have been written to the magnetic tape; and a positioning unit that controls positioning of the head based on number of files whose header data have been read by the reading unit.

2. The magnetic-tape-device control apparatus according to claim 1, further comprising:

a loading unit that loads, upon a magnetic tape being mounted in the magnetic tape device, the header data from the magnetic tape into the storage unit;

an updating unit that stores in the storage unit, upon a file being written to the magnetic tape, header data that identifies the file; and a writing unit that writes the header data to a predetermined area of the magnetic tape upon completion of writing of the file to the magnetic tape.

3. The magnetic-tape-device control apparatus according to claim 2, wherein the writing unit writes the header data after a last file written to the magnetic tape.

4. The magnetic-tape-device control apparatus according to claim 1, wherein the positioning unit calculates, based on the number of files whose header data have been read by the reading unit, number of tape marks to be skipped during positioning of the head, and positions the head at the target file based on the number of the tape marks.

5. A magnetic-tape-device control method for controlling positioning of a head of a magnetic tape device to position the head at a target file among a plurality of files written to a magnetic tape, the magnetic-tape-device control method comprising:

storing header data that identifies each of the files;

reading stored header data, from header data of a first file written to the magnetic tape to the header data of the target file, in order in which the files have been written to the magnetic tape; and controlling positioning of the head based on number of files whose header data have been read by the reading unit.

6. The magnetic-tape-device control method according to claim 5, further comprising:

loading, upon a magnetic tape being mounted in the magnetic tape device, the header data from the magnetic tape;

updating the header data by storing, upon a file being written to the magnetic tape, header data that identifies the file; and writing the header data to a predetermined area of the magnetic tape upon completion of writing of the file to the magnetic tape.

7. The magnetic-tape-device control method according to claim 6, wherein the writing includes writing the header data after a last file written to the magnetic tape.

8. The magnetic-tape-device control method according to claim 5, wherein the controlling includes calculating, based on the number of files whose header data have been read, number of tape marks to be skipped during positioning of the head, and positioning the head at the target file based on the number of the tape marks.

9. A computer-readable recording medium that stores therein a computer program for controlling positioning of a head of a magnetic tape device to position the head at a target file among a plurality of files written to a magnetic tape, the computer program causing a computer to execute:

storing header data that identifies each of the files;

reading stored header data, from header data of a first file written to the magnetic tape to the header data of the target file, in order in which the files have been written to the magnetic tape; and controlling positioning of the head based on number of files whose header data have been read by the reading unit.

10. The computer-readable recording medium according to claim 9, further comprising:

loading, upon a magnetic tape being mounted in the magnetic tape device, the header data from the magnetic tape;

updating the header data by storing, upon a file being written to the magnetic tape, header data that identifies the file; and writing the header data to a predetermined area of the magnetic tape upon completion of writing of the file to the magnetic tape.

11. The computer-readable recording medium according to claim 10, wherein the writing includes writing the header data after a last file written to the magnetic tape.

12. The computer-readable recording medium according to claim 9, wherein the controlling includes calculating, based on the number of files whose header data have been read, number of tape marks to be skipped during positioning of the head, and positioning the head at the target file based on the number of the tape marks.

* * * * *